United States Patent
Hamblin

(10) Patent No.: US 8,066,436 B2
(45) Date of Patent: Nov. 29, 2011

(54) MALE CONTACT FOR OPTICAL FIBER

(75) Inventor: Christopher Hamblin, Worthing (GB)

(73) Assignee: Interlemo Holding S.A., Ecublens (CH)

( * ) Notice: Subject to any disclaimer, the term of this patent is extended or adjusted under 35 U.S.C. 154(b) by 229 days.

(21) Appl. No.: 12/600,522

(22) PCT Filed: May 7, 2008

(86) PCT No.: PCT/IB2008/051773
§ 371 (c)(1),
(2), (4) Date: Nov. 17, 2009

(87) PCT Pub. No.: WO2008/149252
PCT Pub. Date: Dec. 11, 2008

(65) Prior Publication Data
US 2010/0150503 A1    Jun. 17, 2010

(30) Foreign Application Priority Data

Jun. 4, 2007 (EP) ..................................... 07010958

(51) Int. Cl.
*G02B 6/38* (2006.01)
(52) U.S. Cl. ........................................... 385/72; 385/87
(58) Field of Classification Search .................. 385/60, 385/62, 66, 72, 78, 79, 84, 87
See application file for complete search history.

(56) References Cited

U.S. PATENT DOCUMENTS 4,964,690 A * 10/1990 Lappohn et al. ................ 385/58

FOREIGN PATENT DOCUMENTS

| DE | G 93 14 172.6 U | 2/1994 |
| DE | G 93 14 172.6 U1 * | 3/1994 |
| EP | 0 390 275 A | 10/1990 |
| EP | 1 079 251 A | 2/2001 |
| WO | WO 2007/050470 A | 5/2007 |

* cited by examiner

*Primary Examiner* — Michelle R Connelly Cushwa
(74) *Attorney, Agent, or Firm* — Frommer Lawrence & Haug LLP; Ronald R. Santucci

(57) ABSTRACT

The invention relates to a male contact for an optical fiber (1), that comprises an outer body (2) of an elastically deformable material, a cylindrical guide (6) having a front portion (5) attached in the rear portion (4) of the outer body (2) and a rear portion (7) protruding from the rear portion (4) of the outer body (2). A cable adapter (65) extends through the cylindrical guide (6). An elongated floating ferrule (18) extends through the front portion (3) of the outer body (2). The ferrule (18) is connected to a ferrule holder (13) movably mounted in said outer body (2). It comprises abutment means (19) bearing on the first shoulders (11) of the outer body (2), and a helical spring (21) provided between the front portion (5) of the cylindrical guide (6) and the abutment means (19) of the ferrule holder (13). The cable adapter (65) is mounted so as to float within the cylindrical guide (6).

12 Claims, 2 Drawing Sheets

MALE CONTACT FOR OPTICAL FIBER

This application is a 371 of PCT/IB2008/051773 filed on May 7, 2008, published on Dec. 11, 2008 under publication number WO 2008/149252 A which claims priority benefits from European Patent Application Number 07010958.2 filed Jun. 4, 2007, the disclosure of which is incorporated herein by reference.

The present invention relates to a male contact for optical fiber comprising an outer body of an elastically deformable material, a cylindrical guide having a front portion attached to the rear portion of said outer body, and a rear portion protruding from said rear portion of said outer body, a cable adapter extending through said cylindrical guide, an elongated floating ferrule equipped with a fiber segment, said ferrule extending through the front portion of said outer body and being connected to a tubular ferrule holder movably mounted in said outer body and having abutment means suitable for bearing on first shoulders provided between the front and rear portions of said outer body, and a helical spring provided between the front portion of said cylindrical guide and said abutment means of the ferrule holder pushing said abutment means of the ferrule holder against the shoulders of said outer body.

Such male contacts for optical fiber are widely used in the field of communications and high speed data transmissions for coupling optical fibers together or even to light sources or to detectors. They are of particular interest when a large number of fibers have to be installed in a single connector or insert since, because of this, the difficulties in individually positioning and gluing the fibers in the connector are avoided, the major drawback of this solution being that the breaking of a single fiber requires all of the assembly to be replaced. In these male contacts for optical fiber, the cable adapter is necessary in order to provide a crimping function between said cable adapter and the plastic cladding hot-glued to the optical fiber which extends from the floating ferrule, through the outer body and said cable adapter.

When assembling such a male contact for optical fiber, the optical fiber is installed in said floating ferrule which is then the subject of a very precise polishing operation because its end must have a specific form in order to ensure that the signal is transmitted without losses. This work, carried out on a fiber with a diameter of 0.125 mm, requires particular meticulousness and specific apparatus and tools.

When having to repair an optical fiber cable, following the breaking of one or more fibers located outside of a workshop, for example when transmitting a sporting event or an outside report live, the necessary tools and apparatus, or even the electrical power supply for mounting the optical fiber in the ferrule and polishing it, are not always available.

To overcome this problem, the male contact for optical fiber has been equipped with an optical fiber segment glued precisely in the ferrule and the end of which is polished in the factory. When a break occurs, such a male contact is used by inserting a new optical fiber through said cable adapter until it comes into contact with the unpolished end of said fiber segment located inside said ferrule. Said cable adapter is crimped onto the plastic cladding of the new fiber and a more than satisfactory repair is thus obtained, even if the quality of the signal is not as good as that of an original fiber in one portion. A drop of specific optical gel placed at the junction of the two fiber ends in contact enhances this transmission.

Nevertheless, when crimping the new fiber, a slight displacement toward the rear end of the contact can compromise the quality of the junction. The temperature differences, because it may be necessary to work in extreme atmospheric conditions, can break this junction by expansion or shrinkage of the two fiber portions and/or of the optical gel.

The aim of the present invention is to propose a male contact making it possible to overcome the abovementioned drawbacks.

The male contact according to the invention is characterized by the characterizing clause of claim 1.

Variant embodiments are defined in the dependent claims.

The benefit of the male contact according to the invention is the fact that the cable adapter in the cylindrical guide is mounted to float. In practice, after having inserted the new optical fiber through the cable adapter as far as the junction with the fiber segment attached inside the ferrule and crimped said cable adapter, the removable abutment is removed from said cable adapter. The removal of said removable abutment enables the cable adapter, under the pressure of the helical spring inside the cylindrical guide, to maintain a thrust on the cable adapter so ensuring a permanent contact at the junction of the two optical fiber ends. The spring is specially engineered to ensure this junction both in case of expansion and contraction of the two fiber portions.

According to a variant, the junction of the two optical fiber portions is made in line with an orifice provided on the ferrule, which also provides a way for the optical gel at the junction position to be evacuated outside the channel of the ferrule in which the fibers are housed.

One embodiment of the present invention will be described using the appended drawing.

Figure 1:
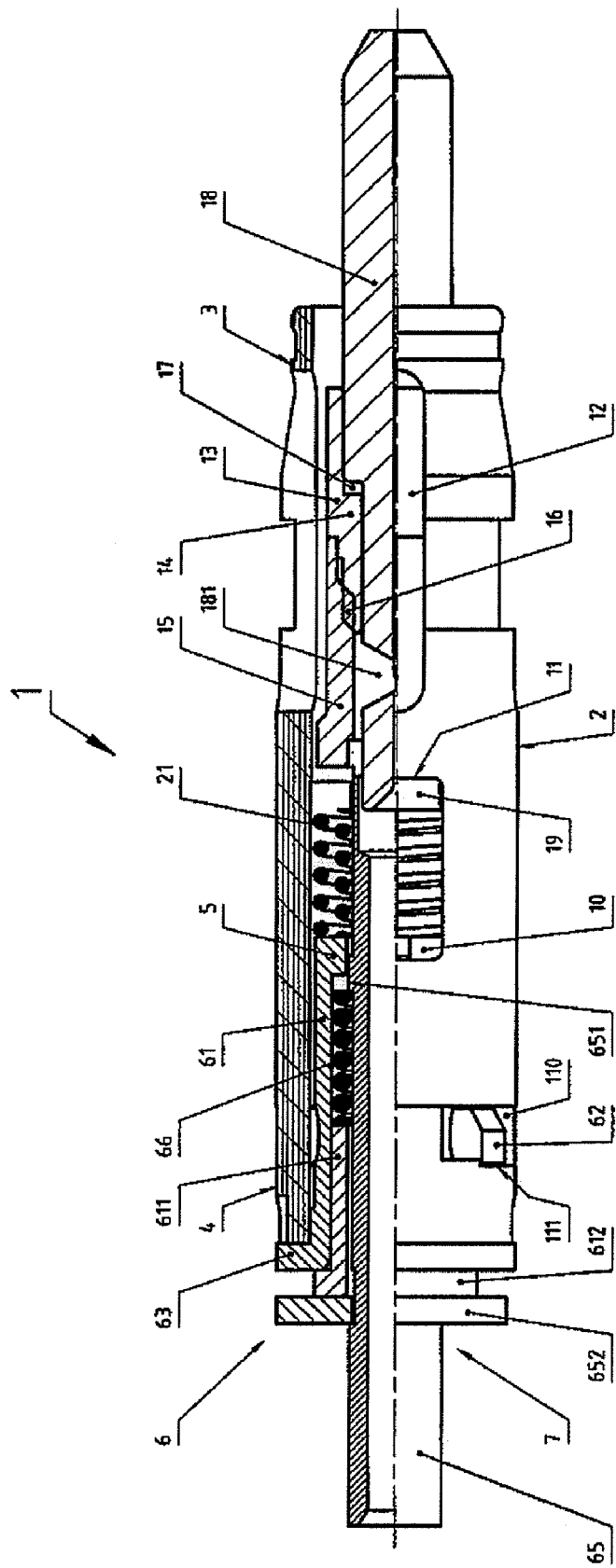
FIG. 1 is a partially cross-sectional longitudinal view of a male contact without fiber.

The outer body 2 is preferably produced by injection molding from an elastically expandable plastic material. Two windows 10 are molded in the outer body 2 between its front 3 and rear 4 portions, these windows being diametrically opposite, and their front end wall forms first shoulders 11. Starting from these two windows 10, two inner longitudinal recesses (not shown) culminate at the edge of the rear portion 4 of the outer body 2. Between these windows 10 and the rear portion 4 of the outer body 2, two other windows 110 are also molded diametrically opposite, their rear end wall forming two shoulders 111. Starting from these two windows 110, two annular inner recesses (not shown) extend over approximately 90°. Two longitudinal inner recesses (not shown) extend between the end of two annular recesses and the edge of the rear portion 4 of the outer body 2.

The front portion 3 of the outer body 2 comprises four longitudinal slots 12 which are in pairs molded in the outer body and diametrically opposite, two of these slots 12 being aligned respectively on the windows 10.

The ferrule holder 13 comprises a front tubular portion 14 and a rear tubular portion 15 which are screwed one into the other at the position 16. The front portion 14 comprises a longitudinal space 17 in which a cylindrical ferrule 18, equipped with a segment of optical fiber 182 (FIG. 2), is inserted with fit by crimping or gluing.

The rear portion 15 of the ferrule holder 13 comprises two radially protruding portions or fins 19, positioned diametrically opposite, the outer diameter of which is greater than the inner diameter of the outer body 2, and which are adapted to be housed in the windows 10 of the outer body 2.

A helical spring 21 is located after the rear end of the portion 15 and bears against its edge.

The male contact 1 for optical fiber is assembled as follows:

Mounting can be done in a way similar to that described in EP-A-1079251, namely by exploiting the elastic deformation of the outer body 2. Nevertheless, in the variant described hereinbelow, another method has been selected. The portion 15 of the ferrule holder 13 is introduced through the rear portion 4 of the outer body 2 so that the fins 19 slide in the longitudinal recesses culminating at the windows 10, a slight elastic deformation of the outer body 2 assists this placement. When the fins 19 arrive in the windows 10, the outer body 2 resumes its shape and the portion 15 is captive. Then, the spring 21 (which can be double as shown) is introduced and abuts against the fins 19 of the portion 15.

Next, the cylindrical guide 6 is introduced into the rear portion 4 of the outer body 2. The first step is to introduce the cable adapter 65 into a first cylindrical body 61, followed by a spring 66, a second cylindrical body 611 is driven and/or glued until its annular shoulder 612 abuts against the edge of the first cylindrical body 61. In this position, the spring 66 is compressed between the edge of the front end of the body 611 and a shoulder 651 located on the cable adapter 65. A removable abutment 652, which can be a circlip, mounted in a recess of the cable adapter and bearing against the annular shoulder 612 of the second cylindrical body 611 keeps the spring 66 compressed. The first cylindrical body 61 is provided with two diametrically opposite outer radial fins 62. The duly assembled cylindrical guide 6 is introduced through the end of the rear portion 4 into the outer body 2 by sliding the fins 62 in the longitudinal grooves that culminate at the annular grooves. On arriving at the end of travel of these annular grooves, the assembly is turned approximately 90° and the fins 62 culminate in the windows 110 while the annular shoulder 63 of the first cylindrical body 61 abuts against the rear edge of the outer body 2. A bayonet lock is thus obtained, the fins 62 bearing against the shoulders 111. Then, the ferrule 18 driven into and/or glued in the portion 14 of its holder is introduced through the front end of the outer body 2. The two portions 15 and 14 are assembled by screwing. Glue is deposited on the screw thread in order to prevent it unscrewing. The helical spring 21 is kept compressed between the front portion 5 of the first cylindrical body 61 and the edge of the rear portion 15 of the ferrule holder 13. The spring 21 pushes the fins 19 against the shoulders 11 and the fins 62 against the shoulders 111. With the ferrule holder 13 duly housed inside the outer body 2, the ferrule 18 remains floating and extends through the front portion 3 of the outer body 2.

Modifications are possible in the context of the scope of the present invention.

For example, the number and the relative positioning of the windows 10, 110 and of the longitudinal slots 12 can be different. The angular position of the longitudinal slots 12 can also be different. The windows 10 and 110 of the outer body 2 can be replaced by two internal annular walls molded in the outer body 2. In this case, the fins 19 of the ferrule holder can be replaced by a disk-shaped portion formed on the rear portion 15 of the ferrule holder 13. The cylindrical guide 6 could be made of a single cylindrical body.

Figure 2:
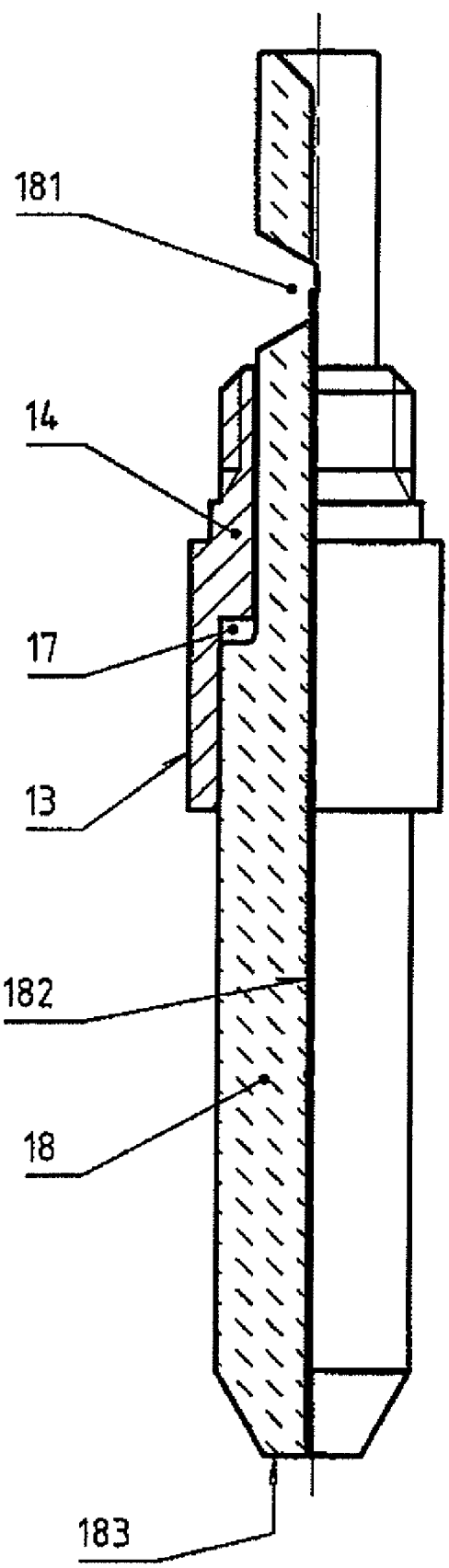
FIG. 2 is a partially cross-sectional longitudinal view of a ferrule with a portion of the ferrule holder.

As shown in FIG. 2, a segment optical fiber of 182 is glued in the ferrule 18. Its front end 183 is polished scrupulously in the factory. The other end of the segment 182 arrives at the middle of an orifice 181 of the lateral wall of the ferrule 18. A drop of optical gel is also deposited into this orifice.

When wanting to use this male contact, the optical fiber must be introduced through the rear end of the cable adapter 65 until the end of said fiber comes into contact with the end of the segment 182 situated in the orifice 181, the optical fiber is crimped by usual means in the cable adapter 65, then the removable abutment 652 is removed. Under the thrust of the spring 66, the cable adapter 65 ensures that the two optical fiber ends are in contact. The dimensions of the spring 66 are such as to "compensate" for any displacements of the fiber when crimping the latter and modifications in length on changes of temperature. The orifice 181 on the one hand provides a way of evacuating any excess optical gel and on the other hand, compensates for the expansion of the optical gel should the temperature increase. Thus, this floating assembly ensures constant contact of two optical fiber ends.

To join two male contacts according to the invention (face to face), an aligning bush is used, into which the two contacts click so that the free ends of two ferrules touch.

The invention claimed is:

1. A male contact for optical fiber comprising an outer body of an elastically deformable material, a cylindrical guide having a front portion attached to the rear portion of said outer body, and a rear portion protruding from said rear portion of said outer body, a cable adapter extending through said cylindrical guide, an elongated floating ferrule equipped with a fiber segment, said ferrule extending through the front portion of said outer body and being connected to a tubular ferrule holder movably mounted in said outer body and having abutment means suitable for bearing on first shoulders positioned between the front and rear portions of said outer body, and a helical spring provided between the front portion of said cylindrical guide and said abutment means of the ferrule holder pushing said abutment means of the ferrule holder against the first shoulders of said outer body, wherein the cylindrical guide comprises a first cylindrical body provided with abutment means suitable for engaging with second shoulders of said outer body situated between said first shoulders and the rear portion of said outer body and an annular shoulder bearing against the edge of the rear portion of said outer body, that said first cylindrical body comprises an inner shoulder, that the cable adapter is mounted to slide inside said first body, that the cable adapter is provided with an annular shoulder situated downstream of the front portion of the first cylindrical body providing a housing therein for a helical spring bearing on said annular shoulder of the cable adapter and on the inner shoulder of the first cylindrical body pushing the cable adapter toward the rear end of the ferrule and that said cable adapter is provided on its part located outside the first cylindrical body with a removable abutment bearing against the edge of the rear portion of the cylindrical guide keeping said helical spring situated inside the first cylindrical body compressed and allowing the cable adapter to float inside said cylindrical guide after said removable abutment is removed.

2. The male contact as claimed in claim 1, wherein said inner shoulder of the first cylindrical body is a second cylindrical body joined to the first cylindrical body and bearing by an annular shoulder against the annular shoulder of said first cylindrical body and of a length less than that of said first cylindrical body.

3. The male contact as claimed in claim 1, wherein said removable abutment is a circlip positioned in a recess of said cable adapter.

4. The male contact as claimed in claim 1, wherein the ferrule is provided with a radial orifice close to its rear end giving access to the optical fiber housing.

5. The male contact as claimed in claim 4, wherein the segment of optical fiber fixed in the ferrule extends from the front end of the ferrule to the middle of the orifice.

6. The male contact as claimed in claim 1, wherein said first shoulders of the outer body are formed by terminal walls of the windows molded in the outer body, and said abutment means are produced by radial projections of the ferrule holder respectively adapted to be housed in said windows and that the second shoulders of the outer body are formed by the terminal walls of the windows molded in the outer body and that said abutment means of the first tubular body are produced by radial projections adapted respectively to be housed in said windows.

7. The male contact as claimed in claim 6, wherein each of the windows of the first shoulders is at the end of a longitudinal groove inside the outer body extending to the edge of the rear portion of said outer body, that each of the windows of the second shoulders is at the end of an internal annular groove extending over approximately 90° and the other end of which is the starting point of a longitudinal inner groove extending to the edge of the rear portion of the outer body.

8. The male contact as claimed in claim 6, wherein two pairs of windows are diametrically opposite.

9. The male contact as claimed in claim 1, wherein said front portion of said outer body comprises a plurality of longitudinal slots molded in the outer body at an angular distance that is equal from one to the next.

10. The male contact as claimed in claim 1, wherein said first shoulders are formed by an inner annular wall of the outer body.

11. The male contact as claimed in claim 10, wherein said abutment means are formed by a disk-shaped portion of the ferrule holder.

12. The male contact as claimed in claim 1, wherein said ferrule holder is produced in two tubular portions which are screwed and glued to each other, one of the portions supporting the abutment means, and the other supporting the ferrule.

\* \* \* \* \*